United States Patent [19]

Sugier et al.

[11] 3,856,661

[45] Dec. 24, 1974

[54] REFORMING USING HOMOGENEOUS PLATINUM-IRIDIUM CATALYST

[75] Inventors: André Sugier, Rueil Malmaison; Jean Miquel, Paris, both of France

[73] Assignee: Institut Francais du Petrole, des Carburants et Lubrifiants, Rueil Malmaison, France

[22] Filed: Sept. 21, 1973

[21] Appl. No.: 399,502

Related U.S. Application Data

[62] Division of Ser. No. 115,852, Feb. 16, 1971, Pat. No. 3,761,428.

[30] Foreign Application Priority Data

Feb. 23, 1970 France .............................. 70.06454

[52] U.S. Cl.................. 208/138, 208/139, 208/143, 260/683.3
[51] Int. Cl............................................ C10g 35/06
[58] Field of Search ............ 208/138; 252/460, 472, 252/466 PT

[56] References Cited
UNITED STATES PATENTS

| | | | |
|---|---|---|---|
| 2,704,281 | 3/1955 | Appell.......................... | 252/466 PT |
| 2,760,940 | 8/1956 | Schwarzenbek..................... | 252/472 |
| 2,777,805 | 1/1957 | Lefrancois et al. ........... | 252/466 PT |
| 2,781,323 | 2/1957 | Hunter.............................. | 252/460 |
| 2,848,377 | 8/1958 | Webb.......................... | 252/466 PT |
| 3,507,781 | 4/1970 | Spurlock et al............... | 252/466 PT |
| 3,554,902 | 1/1971 | Buss............................. | 252/466 PT |

*Primary Examiner*—Delbert E. Gantz
*Assistant Examiner*—S. Berger
*Attorney, Agent, or Firm*—Millen, Raptes & White

[57] ABSTRACT

A catalyst which comprises a carrier, from 0.005 to 1 % of platinum and from 0.005 to 1 % of iridium with respect to the carrier with a substantially homogeneous distribution of platinum and iridium. This catalyst may be used for conversion, for example by reforming, of hydrocarbons. Its process of manufacture comprises the use of an aqueous solution of both platinum and iridium compounds and an aminoalcohol at a pH not in excess of 4.

8 Claims, No Drawings

REFORMING USING HOMOGENEOUS PLATINUM-IRIDIUM CATALYST

This is a division, of application Ser. No. 115,852, filed Feb. 16, 1971, now U.S. Pat. No. 3,761,428 issued Sept. 25, 1973.

This invention relates to a new catalyst containing platinum and iridium, said metals being regularly distributed in the carrier.

This catalyst may be used for reforming hydrocarbons or in any other conversion reaction such as hydrogenation, dehydrogenation or isomerisation of hydrocarbons.

The regular distribution of the active elements of the catalyst in the carrier results from a particular method for manufacturing the catalyst. It has been found that the manufacture of catalysts containing platinum and iridium on a carrier is attended with difficulties in view of the selective adsorption which occurs when the carrier is impregnated with the solution containing the active elements to be introduced therein.

For example, when manufacturing a reforming, dehydrogenation, isomerisation or hydrogenation catalyst, the conventionally used ammonium salts, such as ammonium chloroplatinate, ammonium chloroiridate or other ammonium salts, do not inhibit the chromatography effects which result in metal agglomeration leading to catalysts which quickly lose their activity. This is the case of, for example, the platinum/iridium catalyst of U.S. Pat. No. 2,848,377, which is manufactured according to conventional methods.

This chromatographic effect, which already appears when only one active element is deposited, is quite detrimental when platinum and iridium are both to be deposited in homogeneous manner.

It has been found that the quality and the homogeneity of this impregnation may be substantially improved by using as impregnation solution, an aqueous solution of platinum and iridium compounds containing an amino-alcohol having, for example 1 to 6 OH groups and 1 to 6 amine groups and preferably 2 to 20 carbon atoms per molecule, the pH of the solution being at most 4 and preferably at least 1, or better, 1.5, equivalent to pH range of 1–4 and 1.5–4 respectively.

Typical amino-alcohols are ethanolamine, propanolamines, butanolamines, diethanolamine, 2,2-diamino-1,3-propanediol, 2,2,3-triamino-1-propanol or triethanolamine. Ethanolamine is the preferred amino-alcohol.

As a rule, to obtain an homogeneous impregnation of the active elements on the carrier, there is preferably used from 0.05 to 1.5 mole of amino-alcohol per mole of the platinum and iridium compounds considered as chloroplatinic and chloroiridic acids.

The carrier may be silica, alumina, magnesia, aluminasilica or any other solid material having suitable textural and structural properties.

Typical platinum and iridium compounds are chloroplatinic acid, platinum tetrachloride, bromoplatinic acid, chloroiridic acid, iridium tetrachloride, ammonium compounds such as ammonium chloroplatinate and ammonium chloroiridate.

Platinum and iridium may be used in individual amounts of 0.005 to 1% by weight with respect to the carrier. Iridium is preferably used in an amount of 0.005 to 0.1% and particularly 0.01 to 0.09%. Preferred catalysts contain about 0.35% or 0.2% platinum and 0.08% iridium. The catalyst may contain 0 to 15% of halogen, for example fluorine or chlorine, and preferably, 0.2 to 3% b.w. with respect to the carrier.

The catalysts of this invention, containing platinum and iridium, may be used in conventional reactions, for example reforming, isomerisation, dehydrogenation, hydrogenation and the like.

The homogeneity of the impregnation on the carrier may be controlled with the well-known Castaing microanalyser which has been the object of the Tubingen Congress (West Germany, Sept. 13–16, 1968). This microanalyser is described in volume XVII of Chemical Analysis (Electron Probe Microanalysis by L. S. Birks) published in 1963 by Interscience Publishers (New York/London).

The Castaing microanalyser may be used to examine the plane cross section of a catalyst grain with X-rays, and to determine the superficial distribution of the considered metal elements, Pt and Ir. There is obtained a diagram showing the distribution of each element along an axis determined on the surface by recording the X-spectrophotometer signal during the scanning along this axis.

There is given hereafter the operating directions with respect to alumina, although the same directions apply to the other carriers.

MANUFACTURE OF THE SAMPLES

Agglomerates of catalyst (the size and the shape of the agglomerates is without influence on the method of Castaing. For example, the agglomerates may have their larger dimension between 0.2 and 50 mm; the other dimensions being at least 0.1 mm), are finely polished with a diamond along plane sections and observed by reflection microscopy and analysed by points, at the micron scale, in an electronic microanalyser.

Before polishing, they had been coated with a resin polymerisable at low temperature, by groups of 10 in the same manufactured series.

METALLISATION

It has been found necessary to coat the thus prepared surfaces with a metal, to remove the electric charges which would accumulate at the impact point and would deviate the analyser, and to dissipate the heat thus avoiding the burning of the target. It has been found that a copper layer of 200 A, obtained by metallisation in vacuo was a convenient compromise for a qualitative inspection: if the layer is too thin, it does not work, if it is too thick, it does not allow a proper micrographic inspection.

GENERAL CONDITIONS OF INSPECTION

A 30 kVolts acceleration voltage has been selected to obtain a proper excitation of the L rays of platinum and iridium; it is better that the matrix (alumina) has a low atomic N° since, at this high voltage, it gives only a reasonable noise.

It has been found that the detection sensitivity was the same with either platinum or iridium, and that the emission rays used for the analysis did not interfer with one another.

On the other hand, in view of the known values of the massic absorption coefficients of platinum and iridium in each other, and those of platinum and iridium in alumina, it may be deduced that the detection sensitivity for one element cannot be modified by the presence of the other element (internal absorption).

Finally the current in the analyser has been selected as high as possible ($10^{-7}$A) so as to obtain the highest sensitivity.

DIRECTIONS OF USE

With a fixed beam of electrons, the sample has been moved along a diameter, and, for one given element, the relative concentrations have been recorded as a function of the distance. The sample has also been examined manually, point by point, in an attempt to discover local enrichments.

For a given catalyst manufacture, these checkings have been carried out on about 10 sections to average the results.

RESULTS

It has been found that, when manufacturing a catalyst containing alumina, platinum and iridium according to conventional methods, the two metal elements (platinum and iridium) are mainly present on the edges of the observed section.

If C is the average concentration of a metal element, it has been found that, with catalysts manufactured according to conventional methods, the concentration in at least one point at the periphery of the sample may reach 20 C and even 50 C, said peripheral zone having a width of about one tenth of the diameter of the sample, which means that about 50 to 60 % of the platinum and 50 to 60 % of the iridium are inside this peripheral zone.

Conversely, when using the catalyst manufacturing method of this invention, the resulting catalyst has a concentration, in each point of the carrier, from 0.5 $C_1$ to 2 $C_1$ with respect to platinum (preferably from 0.7 $C_1$ to 1.3 $C_1$ and, whenever possible, from 0.8 $C_1$ to 1.2 $C_1$) and from 0.5 $C_2$ to 2 $C_2$ with respect to iridium (preferably from 0.7 $C_2$ to 1.3 $C_2$ and, wherever possible, from 0.8 $C_2$ to 1.2 $C_2$), $C_1$ and $C_2$ being the respective average concentrations of platinum and iridium on the carrier.

This invention thus relates to a catalyst which contains a carrier and from 0.005 % to 1 % of platinum and from 0.005 % to 1 % of iridium by weight with respect to the carrier, the distribution of platinum and iridium, as determined, for example, with the Castaing microanalyser, being such that, if $C_1$ and $C_2$ are the respective average concentrations of platinum and iridium, the platinum concentration at each point of the carrier is from 0.5 $C_1$ to 2 $C_1$ and the iridium concentration at each point of the carrier is from 0.5 $C_2$ to 2 $C_2$.

EXAMPLE 1

Manufacture of a reforming catalyst containing 0.35 % platinum and 0.09 % iridium by weight from alumina having a surface of 240 m²/g and a porous volume of 57 cc per gram.

The catalyst has been manufactured either according to the method of this invention (catalyst A) or, by way of comparison, according to the conventional method, without amino-alcohol (catalyst $A_1$).

MANUFACTURE OF CATALYST A 0.0023 mole of an aqueous solution of monoethanolamine has been added under stirring to 100 cc of a solution of chloroplatinic acid and chloroiridic acid containing 3.5 g of platinum and 0.91 g of iridium per liter, i.e. 0.022 mole of acids. The resulting solution of pH 2.5 is added to 100 grams (dry weight) of wet alumina (manufactured by contacting 140 cc of water with 100 grams of activated alumina, whose characteristics have been given herebefore, for 30 minutes, adding thereto 80 cc of water containing 5.7 ccm of hydrochloric acid ($d = 1.18$), and after a contact time of 7 hours, filtering the same). The contact is maintained for 5 hours, the material is thereafter dried at 100°C for 1 hour and finally activated by heating at 520°C for 4 hours. The resulting catalyst contains 0.35 % of platinum and 0.09 % of iridium. $C_1$ being the average platinum concentration (0.35%) and $C_2$ the average iridium concentration (0.09%), it can be found, with the Castaing analyser, that the platinum and iridium concentrations, at any point of the carrier, are higher than 0.8 $C_1$ and 0.8 $C_2$ respectively, but do not exceed 1.2 $C_1$ and 1.2 $C_2$ respectively.

MANUFACTURE OF CATALYST $A_1$

The process is the same as with catalyst A, however without addition of the monoethanolamine solution. On the edges of the samples, zones are apparent where the platinum concentrations range up to 20 $C_1$ and the iridium concentrations up to 40 $C_2$.

EXAMPLE 2

The same alumina as in example 1 is used for manufacturing a catalyst containing 0.6 % Pt, 0.03 % Ir and 0.5 % Cl. The catalyst is manufactured as in example 1, either according to the method of example 1 (catalyst B), i.e. with 0.9 ccm of an aqueous solution of 2-amino-1-butanol (0.0032 mole) or, by way of comparison, according to the conventional method (catalyst $B_1$) without amino-alcohol.

The method is that described in example 1 except that there is used a solution of chloroplatinic acid and chloroiridic acid containing 5.85 g of platinum and 0.9 g of iridium per liter (a total of 0.032 mole of these acids), and the amount of butanolamine for catalyst B is about 0.003 mole per 100 ml of solution. $C'_1$ being the average platinum concentration (0.6 %) and $C'_2$ the average iridium concentration (0.03 %) it may be found with the catalyst analyser that:

with catalyst B, at any point of the carrier, the concentrations of platinum and iridium are never higher than 1.2 $C'_1$ and 1.3 $C'_2$ or lower than 0.8 $C'_1$ and 0.7 $C'_2$, and with catalyst $B_1$ zones may be found, on the edge of the samples, where the platinum and iridium concentrations are as high as 20 $C'_1$ and 50 $C'_2$ respectively.

EXAMPLE 3

The catalysts A, $A_1$, B and $B_1$, manufactured according to examples 1 and 2 have been subjected to a heptane test over a long time under severe conditions so as to simulate an accelerated ageing of the catalyst.

Reduction conditions: temperature of 400°C; duration of 15 hours; hydrogen pressure of 10 Kg per sq.cm.

Reaction conditions:
Temperature: 510°C
Pressure: 10 kg/cm²
Liquid feet rate: 120 cc per hour
Hydrogen/hydrocarbon molar ratio: 4

Hydrogen feed rate: 74 liters per hour
Catalyst weight: 20 g
(Hourly weight of charge per weight of catalyst: 4)
Samples have been collected after one hour and then each 50 hours and finally each 100 hours.

The experimental results are shown in the following table in which there are given:

1. the % molar content of light hydrocarbons ($C_3$ and $C_4$), taking the losses into account.
2. and 3. the % molar content of the $C_5$ and $C_6$ in the product.
4. the ratio iso $C_7$/n $C_7$
5. the % molar content of toluene in the product
6. the % molar conversion rate of n $C_7$ tured according to example 1 (catalyst C was manufactured with an amino-alcohol, catalyst $C_1$ without amino-alcohol. The distribution of the metal elements of the two catalysts of this example was substantially that observed with catalysts A and $A_1$).

They are used to dehydrogenate n-paraffins ($C_{10}$–$C_{14}$) to n-olefins at 470°C, in the presence of hydrogen, at a pressure of 2 kg/cm² (hourly volume of charge per volume of catalyst : 4; hydrogen/hydrocarbons ratio : 10).

The conversion rates and selectivities are given in the following table:

| Catalyst | Time in hours | Results of the tests in moles % | | | | | |
|---|---|---|---|---|---|---|---|
| | | Light | $C_5$ | $C_6$ | iso$C_7$/n$C_7$ | Toluene | % n$C_7$ converter |
| A | 1 | 48 | 9 | 3 | 3.5 | 32 | 99 |
| | 50 | 46 | 9.5 | 3.2 | 3.2 | 26 | 98 |
| | 100 | 44 | 10 | 3.4 | 3 | 23 | 96 |
| | 150 | 45 | 10 | 3.4 | 2.9 | 21 | 94 |
| $A_1$ | 1 | 44 | 9 | 4 | 3.4 | 32 | 99 |
| | 50 | 40 | 9.1 | 3.3 | 3.2 | 20 | 96 |
| | 100 | 37 | 8.2 | 3.7 | 2.8 | 14 | 89 |
| | 150 | 35 | 8.1 | 3.6 | 2.2 | 11 | 82 |
| B | 1 | 45 | 7.4 | 3 | 3 | 33 | 99 |
| | 50 | 42 | 7.6 | 3.1 | 3.2 | 30 | 98 |
| | 100 | 40 | 7.6 | 3 | 3.1 | 28 | 98 |
| | 150 | 39 | 7.7 | 3.3 | 3 | 26 | 97 |
| | 200 | 38 | 7.7 | 3.4 | 2.9 | 25 | 96 |
| | 300 | 35 | 8 | 3.5 | 2.8 | 22 | 92 |
| $B_1$ | 1 | 43 | 8 | 4 | 3.2 | 33 | 99 |
| | 50 | 41 | 8.2 | 3.4 | 3 | 27 | 98 |
| | 100 | 38 | 8.1 | 3.8 | 2.7 | 23 | 95 |
| | 150 | 37 | 7.6 | 3.5 | 2.5 | 19 | 92 |
| | 200 | 35 | 7.5 | 3.4 | 2.2 | 16 | 87 |
| | 300 | 36 | 7.5 | 3.3 | 2.0 | 12 | 81 |

EXAMPLE 4

This example relates to the manufacture of an alumina catalyst containing 0.35 % of platinum, 0.05 % of iridium and 10 % of fluorine. This catalyst has been manufactured according to example 1, with or without the particular method of this invention, the fluorine being introduced in the form of hydrofluoric acid. The resulting catalyst is used to isomerise a meta-xylene feed charge to para-xylene. The temperature is 430°C, the pressure 12 kg/cm², the hourly weight of charge per weight of catalyst 5 and the molar ratio of hydrogen to the hydrocarbons 5.

With the catalyst manufactured according to this invention, i.e. with an amino-alcohol, the conversion to paraxylene amounts to 95 % of the thermodynamic balance with a yeild of xylenes of 99.9 % by weight.

The same yield of xylenes of 99.9 % by weight is obtained when the catalyst has been manufactured without aminoalcohol; however, the conversion to paraxylene was only 90 % of the thermodynamic balance (the distribution of the metallic elements of the two catalysts of this example was substantially that of the catalysts A and $A_1$).

EXAMPLE 5

Catalysts of tetragonal γ-alumina containing 0.2% of platinum and 0.04 % of iridium have been manufac-

| Catalyst | Time (hours) | Conversion rate | Selectivity |
|---|---|---|---|
| C | 1 | 26.2 | 85 |
| $C_1$ | 1 | 22 | 81 |
| C | 100 | 19 | 90 |
| $C_1$ | 100 | 18 | 87 |
| C | 300 | 17 | 94 |
| $C_1$ | 300 | 13.5 | 91 |
| C | 500 | 16 | 94 |
| $C_1$ | 500 | 11.5 | 92 |

EXAMPLE 6

Catalysts of transition alumina of 250 m²/g area and 0.65 cm³/g pore volume, containing 0.3 % of platinum and 0.09 % of iridium have been manufactured according to example 1.

Catalyst D was manufactured with an amino-alcohol and catalyst $D_1$ without amino-alcohol; the metal elements are distributed on the carrier substantially as those of catalysts A and $A_1$.

These catalysts are used to hydrogenate a petroleum cut (white-spirit boiling from 150° to 200°C) containing 17% by volume of aromatic hydrocarbons and 15 ppm by weight of sulfur, at a temperature of 300°C and a pressure of 50 kg/cm². The hourly feed ratio per volume of catalyst was 2 and the molar ratio of hydrogen to the feed was 1.

The content of aromatics in the product is given in the following table:

| Catalyst | Time (hours) | % aromatic hydrocarbons by volume in the product |
|---|---|---|
| D | 1 | ≤0.5 |
| $D_1$ | 1 | 1.0 |
| D | 100 | 1.0 |
| $D_1$ | 100 | 1.8 |
| D | 300 | 2.0 |
| $D_1$ | 300 | 3.4 |
| D | 500 | 3.0 |
| $D_1$ | 500 | 5.0 |

Example 7

This example relates to the manufacture of a reforming catalyst containing 0.35 % of platinum and 0.08 % of iridium by weight from alumina having a surface of 240 m²/g and a pore volume of 57 cm³/g.

The catalyst is manufactured either according to the method of the invention (catalyst E) or according to the conventional method (catalyst $E_1$) without addition of an amino-alcohol.

MANUFACTURE OF CATALYST E 0.45 ccm of an aqueous solution of triethanolamine (0.0027 mole) are added to 100 cc of a solution of chloroplatinic acid and chloroiridic acid containing 3.5 g of platinum and 0.8 g of iridium per liter. The resulting solution, of pH 2.5, is added to 100 grams (dry weight) of wet alumina. The latter was manufactured by admixing 100 g of activated alumina, whose characteristics have been given herebefore, with 140 cc of water, maintaining the contact for 30 minutes, adding 80 cc of water with 5.7 cc of hydrochloric acid (sp-gr.:1.18), maintaining the contact for 7 hours and filtering.

The contact of the wet alumina with the solution is maintained for 5 hours, then the alumina is filtered, dried for 1 hour at 100°C and then activated for 4 hours at 520°C.

The resulting catalyst contains 0.35 % platinum and 0.08% iridium. The metal elements are distributed on the carrier substantially as those of catalyst A.

MANUFACTURE OF CATALYST $E_1$

The technique is that described with respect to catalyst E, however without solution of triethanolamine. The elements are distributed on the carrier as those of catalyst $A_1$.

Catalysts E and $E_1$ of example 7 are used for treating a naphtha having the following characteristics:
Distillation ASTM : 72°–170°C
Composition :
 aromatic hydrocarbons : 6.7 % by weight
 naphthenic hydrocarbons : 26.8 % by weight
 paraffinic hydrocarbons : 66.5 % by weight
Octane number "clear research" : about 47
Average molecular weight : 110
Specific gravity at 20°C : 0.733

This naphtha has been passed with recycled hydrogen through each of catalysts E and $E_1$ under the following conditions :
 pressure : 27 bars
 ratio of $H_2$ to the hydrocarbons (moles) : 5
 Hourly weight of naphtha per unit weight of catalyst : 3.

The initial temperature is that providing a liquid product of octane number 97. The temperature is progressively increased to maintain the octane number of 97 as soon as it tends to decrease below this figure. The experiment is interrupted when the temperature attains 530°C. Thus, with catalyst $E_1$, the experiment must be interrupted after 700 hours (the average temperature increase was 4.3°C per 100 hours); on the contrary, with catalyst E, the experiment is interrupted after 1,050 hours (average temperature increase of 2.9°C per 100 hours). These results show that the present process for manufacturing catalysts yields catalysts more stable than those manufactured according to conventional methods. Catalyst E has proved to be more active than catalyst $E_1$ since, after 700 hours, with catalyst $E_1$, the yield by weight of $C_5^+$ is 73 % while, after 700 hours, with catalyst E, the yield by weight of $C_5^+$ is 75.5 %.

What is claimed is:

1. In a process of increasing the octane number of a hydrocarbon mixture containing a substantial percentage of aliphatic hydrocarbons, comprising the step of subjecting said mixture of hydrocarbons to catalytic reforming, the improvement which comprises employing as the catalyst in the catalytic reforming step a catalyst comprising a carrier, from 0.005 to 1% of platinum and from 0.005 to 1% of iridium by weight with respect to the carrier, wherein:

the distribution of platinum and iridium on the carrier is substantially homogenous, said distribution of platinum and iridium, determined with the Castaing microanalyser, being such that, $C_1$ and $C_2$ being respectively the average concentrations of platinum and iridium on the carrier, the concentrations of platinum and iridium at any point of the carrier are in the range of from 0.5 $C_1$ to 2 $C_1$ and from 0.5 $C_2$ to 2 $C_2$, respectively.

2. A process as defined by claim 1 wherein the concentrations of platinum and iridium at any point of the carrier are in the range of from 0.7 $C_1$ to 1.3 $C_1$ and from 0.7 $C_2$ to 1.3 $C_2$, respectively.

3. A process as defined by claim 1 wherein the catalyst contains from 0.005 to 1% of platinum and from 0.01% to 0.09% of iridium with respect to the weight of the carrier.

4. A process as defined by claim 2 wherein the catalyst contains from 0.005 to 1% of platinum and from 0.01% to 0.09% of iridium with respect to the weight of the carrier.

5. A process as defined by claim 1 wherein said carrier is alumina.

6. A process as defined by claim 2 wherein said carrier is alumina.

7. A process as defined by claim 3 wherein said carrier is alumina.

8. A process as defined by claim 4 wherein said carrier is alumina.

* * * * *